(12) United States Patent
Kawasaki

(10) Patent No.: US 7,693,629 B2
(45) Date of Patent: Apr. 6, 2010

(54) ONBOARD FOG DETERMINING APPARATUS

(75) Inventor: Naoki Kawasaki, Kariya (JP)

(73) Assignee: Denso Corporation, Kariya (JP)

( * ) Notice: Subject to any disclaimer, the term of this patent is extended or adjusted under 35 U.S.C. 154(b) by 813 days.

(21) Appl. No.: 11/598,857

(22) Filed: Nov. 14, 2006

(65) Prior Publication Data
US 2008/0110556 A1    May 15, 2008

(51) Int. Cl.
*G01N 21/00* (2006.01)
*G06F 19/00* (2006.01)

(52) U.S. Cl. .......................................... 701/36; 348/148
(58) Field of Classification Search ........................ None
See application file for complete search history.

(56) References Cited

U.S. PATENT DOCUMENTS

| | | | |
|---|---|---|---|
| 6,360,170 B1 | 3/2002 | Ishikawa et al. | |
| 7,423,752 B2 * | 9/2008 | Leleve et al. | ................ 356/338 |
| 2004/0046866 A1 | 3/2004 | Pochmuller et al. | |

FOREIGN PATENT DOCUMENTS

| | | | |
|---|---|---|---|
| EP | 1498721 A1 | * | 1/2005 |
| FR | 2721400 | * | 12/1995 |
| JP | 9-329671 | | 12/1997 |
| JP | 11-278182 | | 10/1999 |
| JP | 11-326541 | | 11/1999 |
| JP | 2000-259998 | | 9/2000 |
| JP | 2001-028746 | | 1/2001 |
| JP | 2001-084485 | | 3/2001 |

OTHER PUBLICATIONS

Office Action dated Nov. 26, 2007 in German Application No. 10 2006 055 145.1-52 with English translation thereof.
Office Action dated July 2, 2007 in German Application No. 10 2006 055 145.1-52 with English translation thereof.
Office Action dated Nov. 10, 2009 in corresponding Japanese Application No. 2005-175743.

* cited by examiner

*Primary Examiner*—Michael J. Zanelli
(74) *Attorney, Agent, or Firm*—Harness, Dickey & Pierce, PLC

(57) ABSTRACT

An image process for determining whether an image is foggy determines a shape of a road for driving of a vehicle in an image captured by an onboard camera based on white road line recognition. Based on the road shape, the process determines, in the image, a distant road area on the road for driving at a specified distance from the vehicle. The process processes, of the entire image captured by the camera, an image portion corresponding to the distant road area to determine whether an image is foggy. Thus, a load on image processing decreases compared with analysis of the entire image. The distant road area is located on the road at the specified distance far from the vehicle in the image. Generally, a road continues in the distance. Since the corresponding area possibly captures a distant part, the fog determination accuracy can be ensured.

12 Claims, 6 Drawing Sheets

ONBOARD FOG DETERMINING APPARATUS

CROSS REFERENCE TO RELATED APPLICATION

This application is based on and incorporates herein by reference Japanese Patent Application No. 2005-175743 filed on Jun. 15, 2005.

FIELD OF THE INVENTION

The present invention relates to an onboard fog determining apparatus for fog determination according to an image captured by an onboard camera.

BACKGROUND OF THE INVENTION

There is known an apparatus that processes an image captured by an onboard camera for fog determination (e.g., patent document 1). The fog determination method in patent document 1 is based on the degree of image blurredness. Since a blurred image results from a fog, the method estimates the degree of image blurredness for fog determination. To estimate the degree of image blurredness, the method first performs differential processing (or differential calculation) for each pixel on an entire image to calculate the edge amount of brightness. Based on the edge amount, the method estimates the degree of image blurredness. Since a blurred image indicates a small edge amount as a whole, it is possible to estimate the degree of image blurredness based on the edge amount.

The apparatus according to patent document 1 uses a result of the fog determination for the white road line recognition. When an image captured by the onboard camera is used for the white road line recognition, a fog blurs the image and makes the white road line recognition difficult. Accordingly, the fog determination is performed before the white road line recognition. Patent document 1 also describes that a fog lamp turns on when the fog is determined to occur.

The apparatus according to patent document 2 determines not only fog, but also image blurredness. The reason follows. When the low visibility due to fog and the like or a dirt on a windshield blurs the image, it becomes difficult to correctly monitor outside the vehicle (e.g., to monitor a distance between a subject vehicle and an object outside).

According to patent document 2, the determination method for image blurredness calculates a brightness edge for an image in a fixed area at the top center of an image. The degree of image blurredness is determined based on a ratio at which the edge exceeds a specified value.

Patent Document 1: JP-3444192 B2 (JP-H11-326541 A)
Patent Document 2: JP-3312729 B2 (JP-2001-28746 A)

In patent documents 1 and 2, the fog determination is performed by determining whether or not an image captured by the onboard camera is blurred. As described in patent document 1, calculating the edge amount for the entire image increases an image processing load. As described in patent document 2, an edge is calculated only in the fixed area at the center top of the image. An image processing load is smaller than that in patent document 1. When an object is close to the subject vehicle, however, the object is relatively clearly captured even in fog. When an object close to the subject vehicle is captured in the fixed area, the fog determination becomes inaccurate. There are some cases where an object close to the subject vehicle is captured in the fixed area at the top center of the image. For example, a forward vehicle is running on the same lane with a small vehicle-to-vehicle distance. In addition, when the vehicle is running on a relatively sharp curve, the fixed area captures a relatively closely located scene at a roadside.

SUMMARY OF THE INVENTION

The present invention has been made in consideration of the foregoing.

It is therefore an object of the invention to decrease a load on image processing for determining whether or not an image is foggy and to ensure fog determination accuracy.

According to an aspect of the present invention, an onboard fog determining apparatus in a vehicle having an onboard camera is provided as follows. Foggy image determining means is included for performing a determination as to whether or not an image captured by the onboard camera is foggy. Road shape determining means is included for determining, in the image, a shape of a road for driving of the vehicle. Distant road area determining means is included for determining, in the image, a distant road area equivalent to an area on a road at a specified distance far from the vehicle, based on the shape of the road. The foggy image determining means uses, of the image, an image portion corresponding to the distant road area so as to perform the determination.

According to the above structure, foggy image determining means does not analyze an entire image captured by an onboard camera, but analyzes an image portion corresponding to a distant road area determined by distant road area determining means. An image processing load decreases in comparison with analysis of the entire image captured by the onboard camera. In addition, an area on a road at a specified distance from a vehicle in the image is used to determine whether or not the image is foggy. Generally, a road continues in the distance. When the area for an image to be analyzed is specified on the road, the area highly possibly captures a distant part, which possibly ensures determination by the foggy image determining means.

According to another aspect of the present invention, a method used in a fog determination apparatus in a vehicle having an onboard camera is provided with the following: determining, in an image captured by the onboard camera, a shape of a road for driving of the vehicle; determining, in the image, a distant road area equivalent to an area on a road at a specified distance far from the vehicle, based on the shape of the road; and determining whether or not an image captured by the onboard camera is foggy, by using, of the image, an image portion corresponding to the distant road area.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
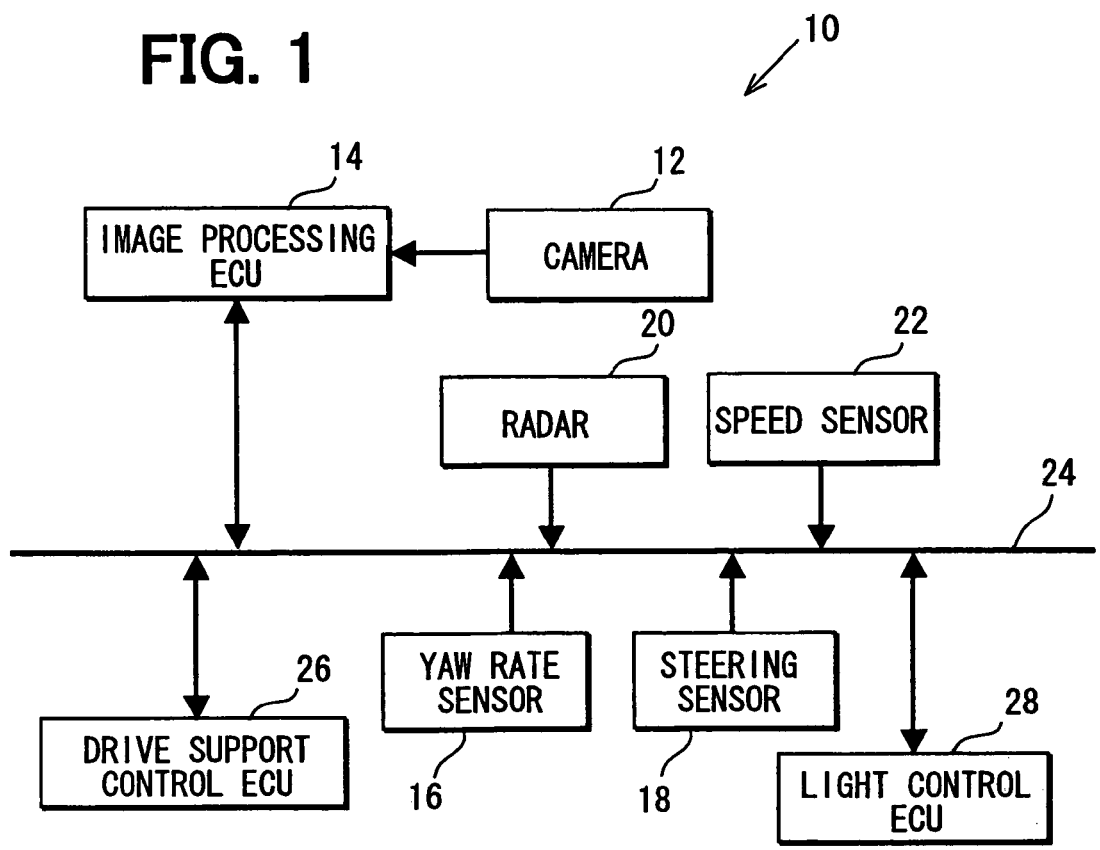
FIG. 1 is a block diagram showing a construction of an onboard fog determining apparatus as an example according to an embodiment of the present invention.

FIG. 1 is a block diagram showing a construction of an onboard fog determining apparatus 10 as an example according to an embodiment of the present invention.

The onboard fog determining apparatus 10 in a subject vehicle includes an onboard camera 12, an image processing ECU (Electronic Control Unit) 14, a yaw rate sensor 16, a steering sensor 18, a millimeter-wave radar 20, and a vehicle speed sensor 22. An interior LAN 24 interconnects these components with each other. The interior LAN 24 also connects with a drive support control ECU 26 and a light control ECU 28.

The onboard camera 12 includes a CCD camera and is installed in the vehicle, e.g., on a ceiling near a driver's seat. The onboard camera 12 continuously captures or photographs an image ahead of the vehicle. The image processing ECU 14 processes data of the captured image.

Figure 2:
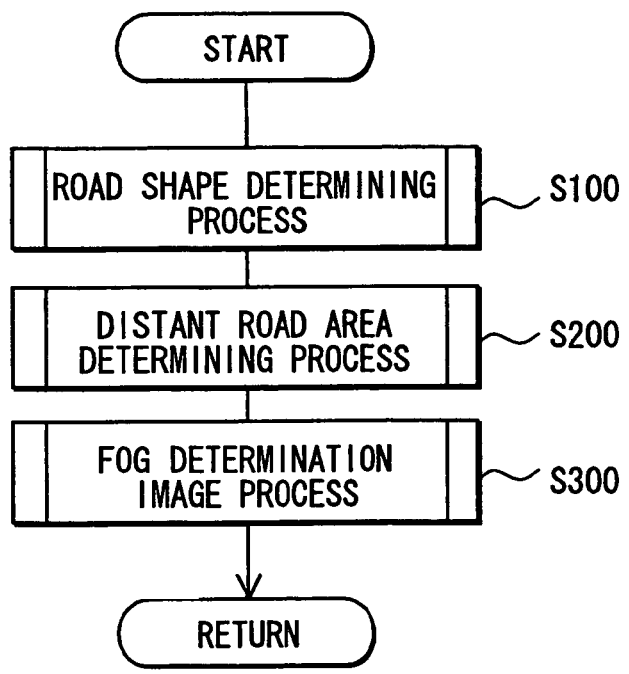
FIG. 2 is a flowchart showing a major part of a control function performed by an image processing ECU in FIG. 1.

The image processing ECU 14 is a computer containing a CPU, ROM, RAM, and the like (not shown). The RAM temporarily stores data for a specified time period of images continuously captured by the onboard camera 12. The CPU follows a program stored in the ROM and performs a process as shown in FIG. 2 for the image data stored in the RAM. The CPU process will be described later.

The yaw rate sensor 16 successively detects a yaw rate of the vehicle. The steering sensor 18 successively detects a steering angle. The millimeter-wave radar 20 radiates a millimeter wave at a specified frequency ahead of the vehicle and receives a reflected wave from an object.

The drive support control ECU 26 also functions as forward vehicle detection means. Based on the reflected wave received by the millimeter-wave radar 20, the drive support control ECU 26 continuously determines the presence or absence of a forward vehicle (a vehicle running ahead of the subject vehicle on the same lane (or traffic lane)). When a forward vehicle is detected, the drive support control ECU 26 calculates a distance between the subject vehicle and the forward vehicle, a relative orientation, and a relative speed. Further based on the calculated information, the drive support control ECU 26 controls drive support control such as vehicle speed control.

When the image processing ECU 14 determines that a fog occurs, the light control ECU 28 provides control over turning on or off a fog lamp (not shown).

Figure 3:
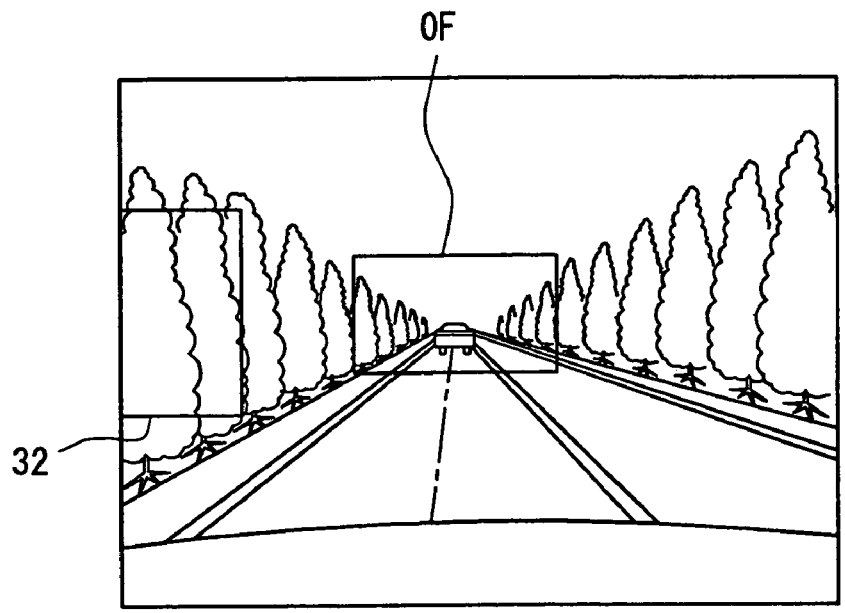
FIG. 3 is an example image captured by an onboard camera.
Figure 4:
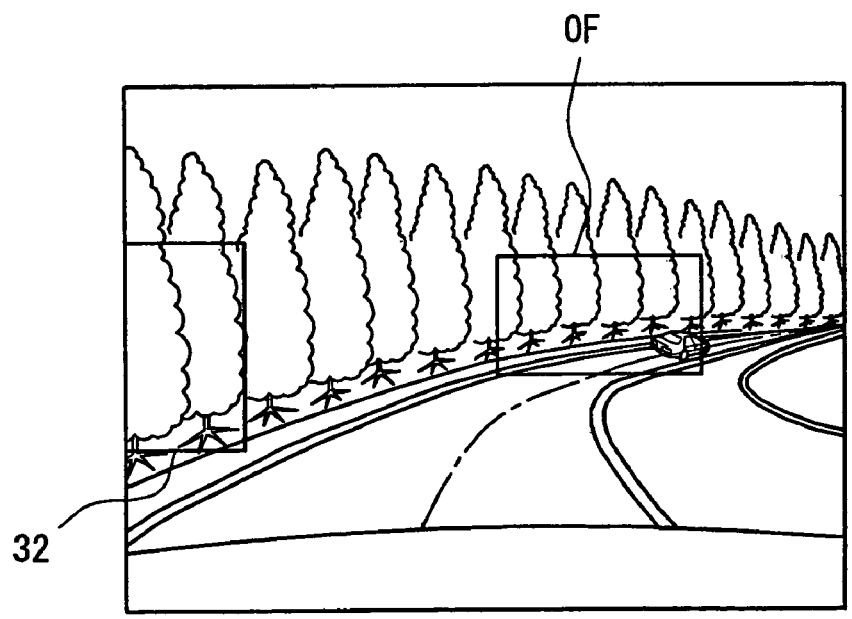
FIG. 4 is an example image captured by the onboard camera.

FIG. 2 is a flowchart showing a major part of the control function performed by the image processing ECU 14. The control in FIG. 2 is performed at a specified cycle during running. While the control is performed, the onboard camera 12 continuously captures images ahead of the vehicle. FIGS. 3 and 4 show example images captured by the onboard camera 12.

As shown in FIG. 2, the image processing ECU 14 first performs a road shape determining process equivalent to road shape determining means (Step S100). The image processing ECU 14 then performs a distant road area determining process equivalent to distant road area determining means (Step S200). Thereafter, the image processing ECU 14 performs a fog determination image process equivalent to foggy image determining means (Step S300).

Figure 5:
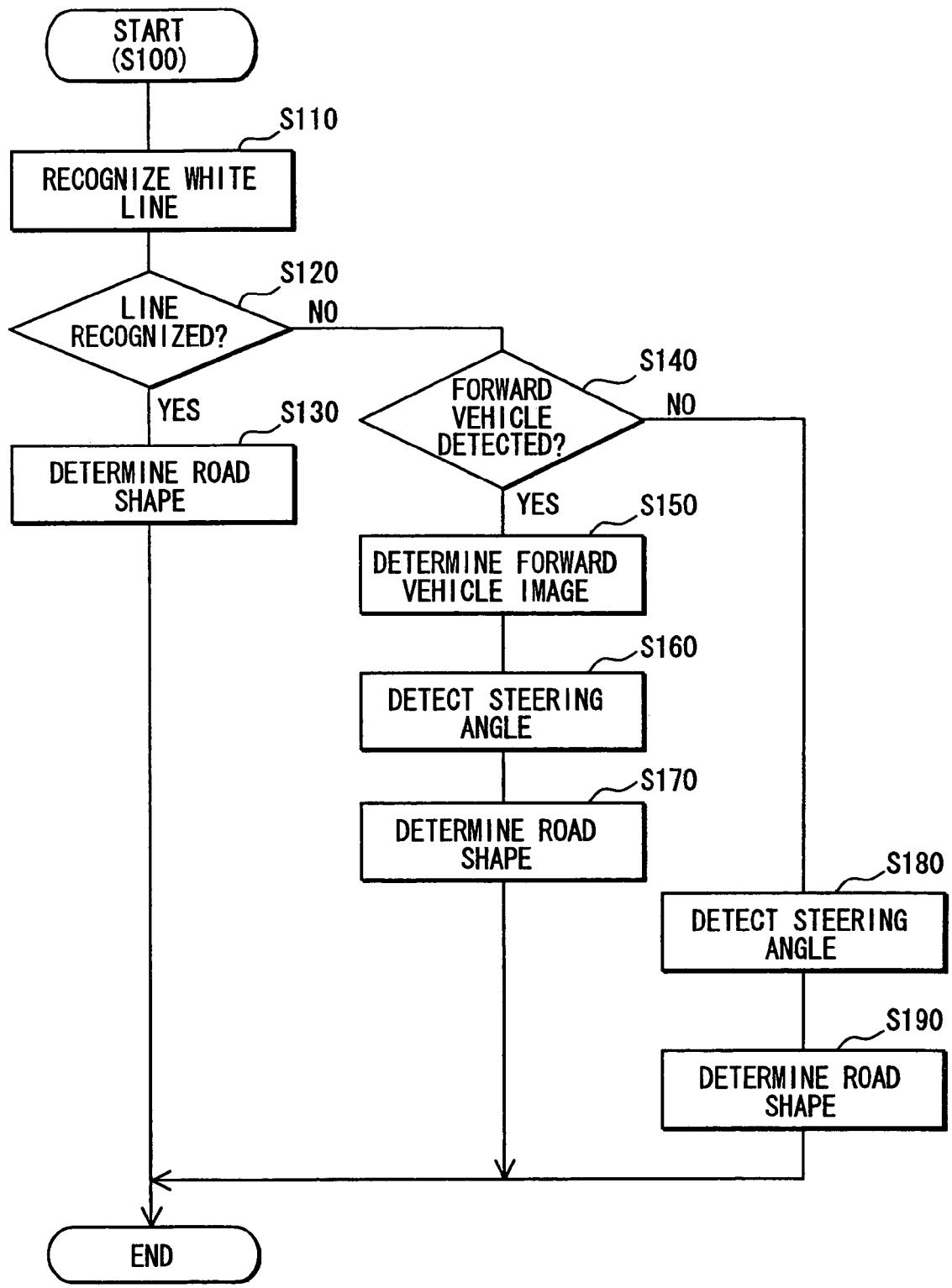
FIG. 5 is a flowchart showing in detail a road shape determining process in FIG. 2.

FIG. 5 shows in detail the road shape determining process at Step S100. At Step S110 in FIG. 5, the process performs a white road line recognition process for recognizing a white road line based on an image continuously captured by the onboard camera 12. The white road line is a road sign provided along a road. Various known processing techniques can be used for the white road line recognition process. One example is to digitize an image captured by the onboard camera 12 and extract a white portion from the digitized image for white line recognition. The white line also includes a yellow line similarly in the ordinary white road line recognition process.

The white road line recognition process at Step S110 cannot always recognize a white line. For example, no white line can be recognized because no white line is drawn on the road. At Step S120, the process determines whether or not a white line is recognized. The purpose is to determine whether or not a white line is so recognized as to be able to determine a road shape at Step S130 to follow. White lines on both sides need not be recognized. It is not necessary to be able to continuously recognize a white line from the subject vehicle's position to a vanishing point. That is, the process determines at Step S120 whether or not a white line is recognized at least on one side for a specified continuous or intermittent length.

When the determination at Step S120 yields an affirmative result, the process proceeds to Step S130 to determine a road shape. The road shape is equivalent to one line that indicates the curving state (shape) of a road extending ahead of the subject vehicle. For example, the road shape is represented by a dash-dot line as shown in FIGS. 3 and 4. The dash-dot line in FIGS. 3 and 4 corresponds to an across-the-width line of a lane where the subject vehicle is running. Instead, the road shape may directly correspond to one of white lines on left and right sides of a lane where the subject vehicle is running. Further, the road shape may correspond to an across-the-width center line for an entire road when it includes multiple lanes. Steps S110 through S130 above are equivalent to first determination means.

When the determination at Step S120 yields a negative result, the process proceeds to Step S140 to determine whether or not the drive support control ECU 26 detects a forward vehicle. When the determination yields an affirmative result, the drive support control ECU 26 already calculates a distance to the forward vehicle and a relative orientation of the forward vehicle. At Step S150, the process determines a position of the forward vehicle in the image based on the distance to the forward vehicle and the relative orientation calculated by the drive support control ECU 26.

At Step S160, the process detects a steering angle based on a signal from the steering sensor 18. At Step S170, the process determines the road shape as follows. The image contains, as an end point for the line indicating the road shape, a predetermined point at the subject vehicle (e.g., a center point of a border line of an engine hood across the vehicle's width direction in the image). Step S150 determines the forward vehicle position in the image. The process connects that end point of the line indicating the road shape and the forward vehicle position using an arc having a curvature radius equivalent to the steering angle determined at Step S160. Steps S140 through S170 are equivalent to second determination means.

When the determination at Step S140 also yields a negative result, the process performs Steps S180 and S190 equivalent to third determination means to determine the road shape. At Step S180, the process detects a steering angle based on the signal from the steering sensor 18. At Step S190, the process determines the road shape as follows. The image contains as an end point for the line indicating the road shape, a predetermined point at the subject vehicle. The process assumes an arc tangent to the predetermined point in the image so that the tangent line becomes parallel to the vehicle's longitudinal direction (or vehicle's heading direction). The process determines the arc to be a line indicating the road shape. At either or both Steps S160 and S180, the process may detect a yaw rate from the yaw rate sensor 16 instead of detecting the steering angle.

The road shapes determined at Step S130, S170, and S190 are differentiated from each other as follows. Step S130 can most accurately determine the road shape based on the white line provided along the road. Step S170 uses the forward vehicle's position in addition to the steering angle. The road shape can be more accurately determined than at Step S190 that is based only on a steering angle. On the other hand, Step S130 cannot determine the road shape when no white line is recognized. Step S170 cannot determine the road shape when no forward vehicle is detected. Step S190 can determine the road shape without fail.

Figure 6:
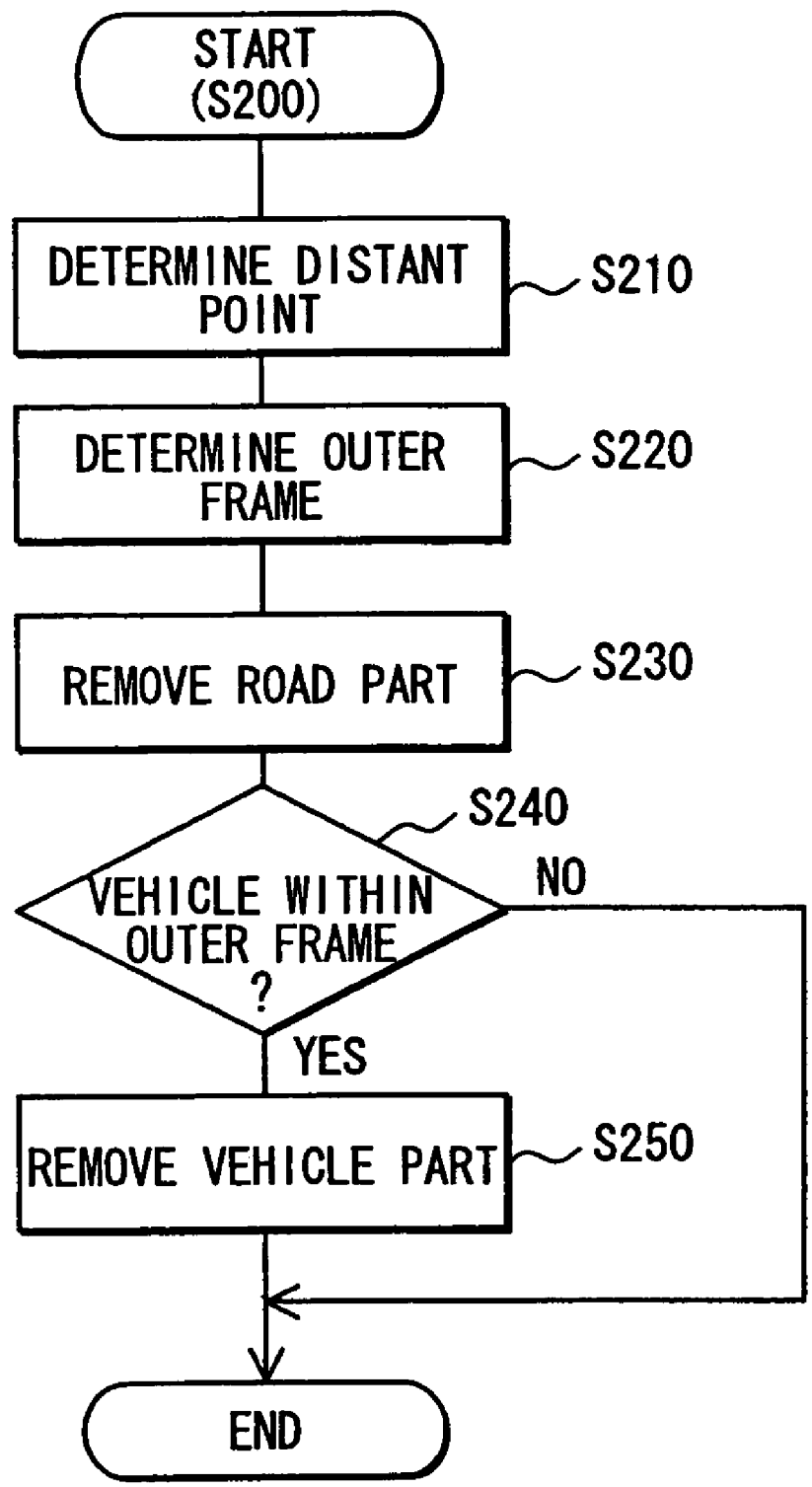
FIG. 6 is a flowchart showing in detail a distant road area determining process in FIG. 2.

When the road shape is determined in this manner, the distant road area determining process (Step S200 in FIG. 2) is performed. FIG. 6 shows the distant road area determining process in detail.

At Step S210 in FIG. 6, the process determines a distant point in the image captured by the onboard camera 12. The distant point is located at a specified distance from the subject vehicle on the road where the subject vehicle is running. Step S210 is equivalent to distant point determining means. In this example, the specified distance is configured to be 100 m but not limited thereto. The distance may be long enough to blur the image in a fog with some degree of the denseness.

Figure 7:
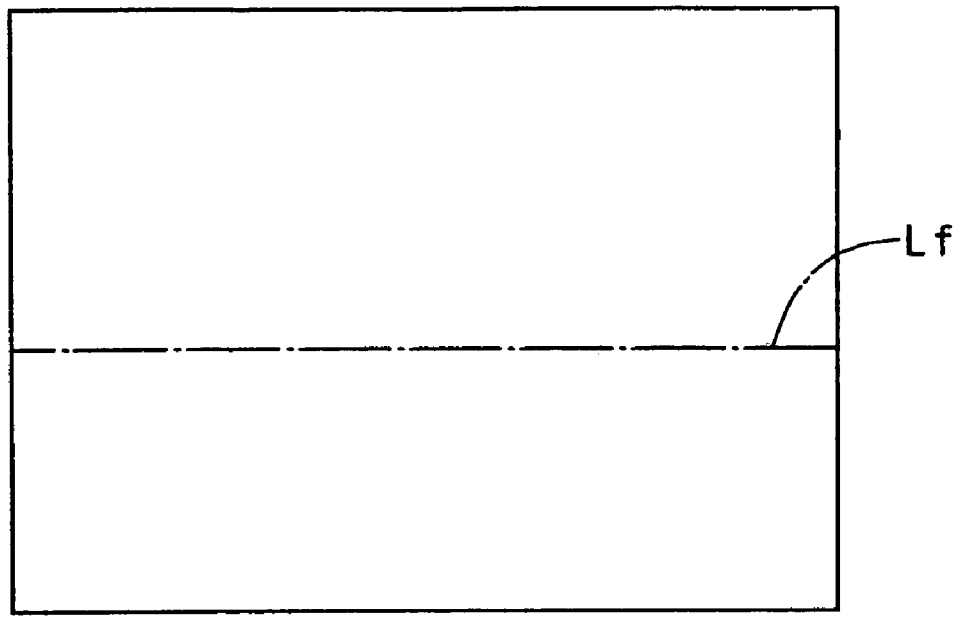
FIG. 7 shows a 100 m line predetermined in an image captured by the onboard camera.

Since the onboard camera 12 is fixed to the vehicle, it is possible to previously determine an actual distance to a given point on the flat ground and a position of that point in the image. Accordingly, it is possible to predetermine a 100 m line in the image for positioning a point 100 m ahead of the subject vehicle on the flat ground. FIG. 7 shows the 100 m Lf in the image. According to the embodiment, the 100 m line U is equivalent to a distant line. The 100 line Lf is stored in the ROM of the image processing ECU 14 or other storage devices. At Step S210, the process finds an intersection point between the 100 line Lf and the line indicating the road shape determined at Step S100. The intersection point is determined to be the distant point (i.e., the point 100 m ahead in this example) on the road where the subject vehicle is running.

At Step S220, the process determines, within the entire image captured by the onboard camera 12, an outer frame OF for a distant road area with reference to the distant point determined at Step S210 above. FIGS. 3 and 4 show the outer frame OF for the distant road area within the entire image. In other words, of the entire image, an image portion corresponding to the distant road area is surrounded by the outer frame OF. The outer frame OF is so configured that the distant point determined at Step S210 is centered on the bottom side of the outer frame OF. The outer frame OF is sized to be small enough for the entire size of the image captured by the onboard camera 12.

The position of the outer frame OF is not limited to the examples in FIGS. 3 and 4 and may be determined so that the distant point is centered in the distant road area. The distant point may be positioned in relation to the outer frame OF for the distant road area depending on whether the road shape corresponds to the across-the-width center line of the driving lane, the across-the-width center line of the entire road, or the white line of the left or right driving lane. For example, let us consider the case where the road shape (or the line indicating it) corresponds to the white line of the right driving lane. The outer frame OF may be positioned so that the distant point indicates a quarter of the outer frame OF for the distant road area from its bottom right corner.

Figure 8:
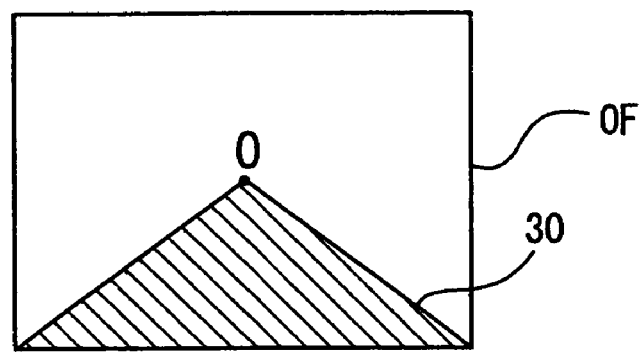
FIG. 8 shows a predetermined fixed road part.

At Step S230, the process removes a road part from the area in the outer frame OF for the distant road area determined at Step S200. The embodiment removes a predetermined fixed road part 30 as shown in FIG. 8. The road part is a triangle with its vertex corresponding to a center O of the outer frame OF and its base corresponding to the bottom side of the outer frame OF.

The road part actually captured in the outer frame OF may be differently shaped depending on the width of the driving road or the road shape whether it is straight or curved. In consideration for this, the road part 30 as a fixed area makes it difficult to accurately remove the road part from the image actually captured in the outer frame OF. Whatever road shape it may be, however, the road part narrows from the bottom to the top in the distant road area. Most part of the road part 30 can be removed even though it is fixed. Further, fixing the road part 30 can reduce computing loads. When the road part is removed at Step S230, the ratio of the roadside relatively increases in the area after the removal.

It is also possible to determine the road part 30 based on the road shape determined at Step S100 without fixing the road part 30. For example, there may be a case where the line indicating the road shape intersects with the outer frame OF of the distant road area at only one point (see FIG. 3). In this case, the road part can be assumed by forming a triangle with its vertex corresponding to the vanishing point and its base corresponding to the bottom side of the outer frame OF. There may be another case where the line indicating the road shape intersects with the outer frame OF of the distant road area at two points (the low intersecting point is on the bottom side of the outer frame OF, while the high intersecting point is other than on the bottom side) (see FIG. 4). In this case, the road part can be assumed by forming a triangle with its vertex corresponding to the high intersection point (or a point higher than the high intersection by a specified coordinate) and its base corresponding to the bottom side of the outer frame OF. The image process may recognize a white line and determine the road part based on the white line.

At Step S240, the process determines whether or not a vehicle part is contained in the outer frame OF determined at Step S220 for the distant road area. The fog determination is difficult when a vehicle at close range is contained in an image determined to be the distant road area. The determination at Step S240 is intended to remove such vehicle at close range from the image in the distant road area. At Step S240, the process first determines whether or not the drive support control ECU 26 detects the presence of a forward vehicle. When the presence of a forward vehicle is detected, the process determines an image processing range supposed to contain the vehicle based on the position and the relative distance specified by the drive support control ECU 26 for the forward vehicle. The process determines the vehicle part by performing a known image process for the image processing range such as determining a vehicle outline based on brightness changes, for example. The process compares the determined vehicle part with the outer frame OF determined at Step S220 for the distant road area.

When the determination at Step S240 yields a negative result, the routine in FIG. 6 terminates. In this case, the distant road area corresponds to the area in the outer frame OF determined at Step S220 except the road part 30. When the determination at Step S240 yields an affirmative result, the process proceeds to Step S250. The process determines the distant road area to be the area in the outer frame OF determined at Step S220 except the road part 30 and the vehicle part determined at Step S240.

At Step S300, the process performs the fog determination image process for the distant road area determined in this manner. Accordingly, the distant road area can signify an image processing area for performing the fog determination image process.

Figure 9:
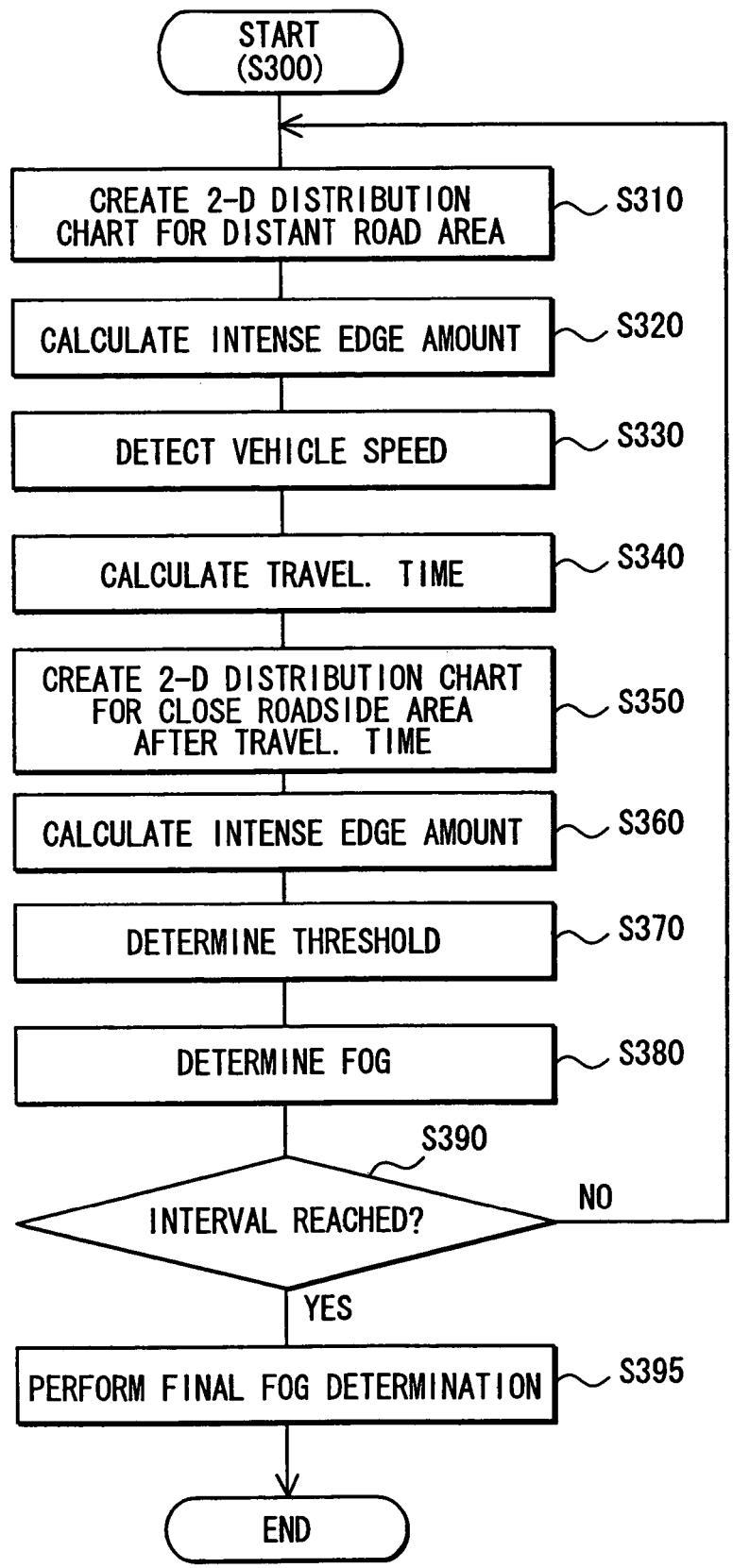
FIG. 9 is a flowchart showing in detail a fog determination image process in FIG. 2.

FIG. 9 shows the fog determination image process at Step S300 in detail. At Step S310 in FIG. 9, the process continuously performs differential processing for an image in the distant road area determined at Step S200 to create a two-dimensional distribution chart for edge strengths. At Step S320, the process calculates an intense edge amount. This signifies a ratio exceeding a specified edge strength (reference strength) in the two-dimensional distribution chart created at Step S310.

At Step S330, the process detects a vehicle speed from the vehicle speed sensor 22. At Step S340, based on the detected vehicle speed, the process calculates a traveling time for a roadside part in the distant road area to need moving to a predetermined close roadside area 32. The close roadside area 32 is a fixed area for capturing so close a roadside as not to blur the image even in the fog. As shown in FIGS. 3 and 4, the close roadside area 32 has a specified size and is positioned at the left or right end of an image captured by the onboard camera 12 and at the vertical center of the image.

As mentioned above, the close roadside area 32 is a fixed area. The distant road area is located at a predetermined distance from the subject vehicle. Accordingly, it is possible to previously determine a traveling distance (to the close roadside area 32) traveled by an object, which is located at the roadside part in the distant road area. At Step S340, the process uses the predetermined traveling distance and the vehicle speed detected at Step S330 to determine the traveling time for the roadside part in the distant road area to move to the close roadside area 32.

At Step S350, similarly to Step S310, the process creates a two-dimensional distribution chart of brightness edge strengths for an image in the close roadside area after a given time lapse. This given time lapse is a lapse of the traveling time calculated at Step S340 after capturing of the image used for creating the two-dimensional distribution chart of edge strengths at Step S310.

At Step S360, similarly to Step S320, the process calculates an intense edge amount for the two-dimensional distribution chart created at Step S350. At Step S370, the process determines a threshold value to be used at Step S380 below based on the intense edge amount calculated at Step S360 for the image in the close roadside area. For example, the process determines the threshold value by multiplying the intense edge amount calculated at Step S360 by a specified value α smaller than 1 (e.g., 0.7). The threshold value is changed depending on whether or not to determine a fog at Step S395 (to be described) during the previous fog determination, i.e., the previous execution of the repetitive routine in FIG. 9. When the previous determination assumes no fog, the specified value α is set to 0.7. When the previous determination assumes a fog, the specified value is set to 0.6.

At Step S380, the process compares the intense edge amount calculated at Step S320 for the image in the distant road area with the threshold value determined at Step S370. When the intense edge amount calculated at Step S320 is greater than the threshold value, the process determines that the image is not foggy. When the intense edge amount calculated at Step S320 is smaller than or equal to the threshold value, the process determines that the image is foggy. As mentioned above, the threshold value is changed based on the previous determination result. A fog can be more easily assumed in the case of determining a fog in the previous determination than in the case of determining no fog in the previous determination. Therefore, even in the case of a light fog, it helps prevent determination results from being changed in a short time period.

At Step S390, the process determines whether or not a final determination interval is reached, assuming the execution time of the first fog determination (S380) to be the beginning of timekeeping. The final determination interval is set to one minute, for example. When the determination yields a negative result, the process is repeated at Step S310 and later.

When the determination at Step S390 yields an affirmative result, the process proceeds to Step S395 and performs the final fog determination. The final fog determination is based on multiple determination results at Step S380 after repeating Steps S310 through S390. When the determination results indicate a ratio of determining a fog greater than or equal to a predetermined ratio, the process determines a fog. When the determination results indicate a ratio of determining no fog greater than or equal to a predetermined ratio, the process determines no fog. In this manner, the final determination uses multiple determination results at Step S380 to improve the determination accuracy. This is because the final determination can prevent incorrect determination even when an image at a given time point causes incorrect determination.

When the predetermined ratio is 50%, the process is sure to determine that a fog may or may not occur. The predetermined ratio may not be limited to 50%. When the process determines neither that a fog may occur nor that a fog may not occur, the previous determination result is maintained.

According to the above-mentioned embodiment, the process at Step S300 (foggy image determining means) does not analyze an entire image captured by the onboard camera 12. The process at Step S300 analyzes a distant road area image determined at Step S200 (distant road area determining means). A image processing load decreases in comparison with the analysis of the entire image captured by the onboard camera 12. In addition, the distant road area for analyzing whether or not the image is foggy is located on the road at a specified distance far from the vehicle in the image. Generally, a road continues in the distance. When the area for an image to be analyzed is located on the road, the area highly possibly captures a distant part. The determination at Step S300 (foggy image determining means) can be ensured.

The embodiment compares an image for the close roadside area 32 predetermined in the image with an image for the distant road area and determines whether or not the image for the distant road area is foggy. This prevents incorrect determination of a fog. Since the vehicle is running on a flat landform, the use of only a distant road area image may incorrectly determine a fog although it is not.

(Modifications)

While there has been described the specific preferred embodiment of the invention, it is to be distinctly understood that the invention is not limited thereto. The technical scope of the invention includes the following embodiments. In addition to the following, various changes and modifications may be made in the invention without departing from the spirit and scope thereof.

For example, the above-mentioned embodiment recognizes the white line as a road sign (or road reference) on a road for determining the road shape. In addition to the white line, road signs on roads include contiguously disposed projections (hemispheric or rod-like) for dividing lanes similarly to the white line, center divider, roadside gully, and rut. It may be preferable to recognize these and determine the road shape.

The above-mentioned embodiment calculates the traveling time for the roadside part in the distant road area to move to the close roadside area. The distant road area image is compared with a close roadside area image captured after a lapse of the traveling time after the distant road area image is captured. The distant road area image may be compared with a close roadside area image captured at the same time as the distant road area image. In this case, the same part (background) is not compared. Even though the same part is not compared, it is possible to prevent the above-mentioned incorrect determination that may occur during travel on a flat landform.

According to the above-mentioned embodiment, the process calculates the intense edge amount for each distant road area at a given time point (S320). Based on the intense edge amount, the process performs the fog determination for each distant road image at a given time point (S380). Using the determination result, the process performs the final determination (S395). Further, the process may average intense edge amounts calculated for the images at given time points and may provide one determination result (final determination) based on the averaged intense edge amount.

According to the above-mentioned embodiment, the road part is removed from the outer frame OF for the distant road area. When the vehicle part is available, it is also removed from the outer frame OF to provide the distant road area. However, the process for removing the road part or the vehicle part is not mandatory. The fog determination may be performed by using all the image in the outer frame OF for the distant road area. One of the road part and the vehicle part may not be removed.

The second determination means (S140 to S170) according to the embodiment determines a road shape by connecting a specified end point at the subject vehicle in the image with the forward vehicle position using an arc having a curvature radius equivalent to the steering angle. The millimeter-wave radar 20 may be configured to detect a vehicle only within a relatively narrow range with reference to the line indicating the vehicle's longitudinal direction. In such case, it may be preferable to determine the road shape by connecting a specified end point at the subject vehicle with a forward vehicle using a straight line. In this case, Step S160 (steering angle detection) becomes unnecessary. To detect a forward vehicle, there may be provided a laser radar instead of the millimeter-wave radar 20. A forward vehicle may be detected by detecting a shape specific to the vehicle such as a rear light and a car license plate from the image.

According to the above-mentioned embodiment, the outer frame OF of the distant road area and the close roadside area 32 are rectangular but not limited thereto. They may be circular or shaped otherwise.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An onboard fog determining apparatus in a vehicle having an onboard camera, the apparatus comprising:
    foggy image determining means for performing a determination as to whether or not an image captured by the onboard camera is foggy;
    road shape determining means for determining, in the image, a shape of a road for driving of the vehicle; and
    distant road area determining means for determining, in the image, a distant road area equivalent to an area on a road at a specified distance far from the vehicle, based on the shape of the road,
    wherein the foggy image determining means uses, of the image, an image portion corresponding to the distant road area so as to perform the determination.

2. The onboard fog determination apparatus of claim 1,
    wherein the road shape determining means has at least two of:
    first determination means for detecting a road sign provided along a road from an image captured by the onboard camera and determining a shape of the road for driving of the vehicle;
    second determination means for detecting a position of a forward vehicle in the image and determining a shape of the road for driving of the vehicle based on the detected position of the forward vehicle; and
    third determination means for determining a shape of the road for driving of the vehicle based on at least one of a steering angle detected by a steering sensor and a yaw rate of the vehicle detected by a yaw rate sensor,
    wherein the first determination means is used to determine a shape of a road for driving of the vehicle,
    wherein the second determination means is used to determine a shape of a road for driving of the vehicle when a shape of the road is not determined by the first determination means, and
    wherein the third determination means is used to determine a shape of a road for driving of the vehicle when a shape of the road is not determined by the first and second determination means.

3. The onboard fog determination apparatus of claim 1, further comprising:
    distant point determining means for determining, in the image, a distant point at a specified distance from the vehicle on a road for driving of the vehicle based on a road shape determined by the road shape determining means and a prestored distant line indicating the specified distance from the vehicle on a flat ground,
    wherein the distant road area determining means determines the distant road area with reference to the distant point.

4. The onboard fog determination apparatus of claim 3,
    wherein the distant road area determining means determines an outer frame of the distant road area with reference to a distant point determined by the distant point determining means and removes at least one of a road part and a forward vehicle part from within the outer frame to reduce the distant road area, and
    wherein the foggy image determining means uses, of the image, an image portion corresponding to the reduced distant road area so as to perform the determination.

5. The onboard fog determination apparatus of claim 1,
    wherein the foggy image determining means determines whether or not an image is foggy, based on an edge strength distribution of brightness for an image portion corresponding to the distant road area.

6. The onboard fog determination apparatus of claim 5, wherein the foggy image determining means determines whether or not an image is foggy, based on a ratio of an edge strength smaller than or equal to a specified strength in an edge strength distribution chart of brightness for the image portion corresponding to the distant road area.

7. The onboard fog determination apparatus of claim 1, wherein the foggy image determining means determines whether or not an image portion corresponding to the distant road area is foggy, by comparing the image portion, which corresponds to the distant road area determined by the distant road area determining means, with an image portion, which corresponds to a close roadside area predetermined as a range of a roadside near the vehicle.

8. The onboard fog determination apparatus of claim 7, wherein the foggy image determining means
calculates an intense edge amount as a ratio smaller than or equal to a specified reference strength in an edge strength distribution chart of brightness for an image portion corresponding to the distant road area,
calculates a threshold value based on an edge strength distribution chart of brightness for an image portion corresponding to the close roadside area, and
determines whether or not an image is foggy, based on comparison between the intense edge amount and the threshold value.

9. The onboard fog determination apparatus of claim 1, wherein the foggy image determining means determines whether or not an image is foggy, based on a plurality of image portions individually corresponding to a plurality of distance road areas determined by the distant road area determining means in images captured by the onboard camera at a plurality of time points.

10. The onboard fog determination apparatus of claim 1, wherein the foggy image determining means repeatedly determines whether or not the image is foggy, and
wherein an image is more easily determined to be foggy in a case of determining the image to be foggy in a previous determination than in a case of determining the image not to be foggy in the previous determination.

11. A method used in a fog determination apparatus in a vehicle having an onboard camera, the method comprising:
determining, in an image captured by the onboard camera, a shape of a road for driving of the vehicle;
determining, in the image, a distant road area equivalent to an area on a road at a specified distance far from the vehicle, based on the shape of the road; and
determining whether or not an image captured by the onboard camera is foggy, by using, of the image, an image portion corresponding to the distant road area.

12. An onboard fog determining apparatus in a vehicle having an onboard camera, the apparatus comprising:
a road shape determining unit that determines, in an image captured by the onboard camera, a shape of a road for driving of the vehicle;
a distant road area determining unit that determines, in the image, a distant road area equivalent to an area on a road at a specified distance far from the vehicle, based on the shape of the road; and
a foggy image determining unit that determines whether or not an image captured by the onboard camera is foggy, by using, of the image, an image portion corresponding to the distant road area.

* * * * *